United States Patent

Wood

[11] 3,944,766
[45] Mar. 16, 1976

[54] SEAT BELT BUCKLE HAVING PUSHBUTTON TYPE SWITCH WITH ELASTOMERIC CONDUCTOR BRIDGING CONTACT

[75] Inventor: Charles G. Wood, Royal Oak, Mich.

[73] Assignee: Essex International, Inc., Fort Wayne, Ind.

[22] Filed: July 3, 1974

[21] Appl. No.: 485,355

[52] U.S. Cl..... 200/61.58 B; 200/16 A; 200/159 R; 200/243; 200/264
[51] Int. Cl.² ..................... H01H 3/16; H01H 13/62
[58] Field of Search...... 200/5 R, 5 A, 16 A, 159 R, 200/159 A, 159 B, 165, 243, 264, 265, 267, 276, 284, 285, 293, 294, 295, 296, 318, 328, 329, 330, 339, 340, 61.58 B, 82 D, 302

[56] References Cited
UNITED STATES PATENTS

| | | | |
|---|---|---|---|
| 3,140,365 | 7/1964 | Voland | 200/16 A |
| 3,509,296 | 4/1970 | Harshman et al. | 200/159 R |
| 3,584,162 | 6/1971 | Krakinowski | 200/159 B X |
| 3,597,564 | 8/1971 | Lewis | 200/296 |
| 3,648,002 | 3/1972 | DuRocher et al. | 200/265 |
| 3,696,408 | 10/1972 | Bouchard et al. | 200/265 X |
| 3,699,293 | 11/1972 | Portugall | 200/267 |
| 3,728,509 | 4/1973 | Shimojo | 200/264 |
| 3,735,058 | 5/1973 | Berry | 200/5 R X |
| 3,735,068 | 5/1973 | Yanaga et al. | 200/264 X |
| 3,758,733 | 9/1973 | DuRocher et al. | 200/82 D |
| 3,781,497 | 12/1973 | Stephenson et al. | 200/159 A X |
| 3,800,105 | 3/1974 | Thornley | 200/264 X |
| 3,818,153 | 6/1974 | Arvai | 200/5 A |
| 3,829,633 | 8/1974 | Smith et al. | 200/16 A |
| 3,873,795 | 3/1975 | Leighton et al. | 200/264 X |

OTHER PUBLICATIONS

IBM Technical Disclosure Bulletin, G. L. Jarvis et al., "Push Button Actuator" Vol. 13, No. 7, Dec. 1970, p. 1755.

Primary Examiner—James R. Scott
Attorney, Agent, or Firm—Learman & McCulloch

[57] ABSTRACT

An electric switch which is constructed, with the exception of two metallic conductors, entirely of elastomeric or thermoplastic materials wherein relative motion between switch operating parts is confined to a resilient deformation and wherein the switching function occurs within a sealed recess or chamber.

11 Claims, 6 Drawing Figures

SEAT BELT BUCKLE HAVING PUSHBUTTON TYPE SWITCH WITH ELASTOMERIC CONDUCTOR BRIDGING CONTACT

The present invention relates to an electric switch construction which achieves a reliable switching operation in a housing of extremely small size. More particularly, the switch is particularly suited for use in an environment in which it is exposed to large temperature variations, moisture, dust, and the like. An example of such an environment is the buckle assembly of a vehicle seat belt.

A switch according to the invention includes a housing molded from a suitable thermoplastic material which is electrically non-conductive. The housing is formed with a relatively large diameter bore extending inwardly from one end of the housing and a coaxial, relatively small diameter recess or extension extending in prolongation of and from the inner end of the larger bore. A pair of spaced electrical conductors are embedded in the housing with portions of the conductors exposed within the recess. A generally cylindrical switch operator formed of a resilient, elastomeric material is located within the large diameter bore with a relatively close fit and with its inner end seated on the inner end of the large diameter bore to define a peripheral seal around the small diameter recess. An actuator, which can be molded integrally with the housing and connected to the latter by a flexible strap, engages the outer end of the operator and, upon actuation, applies a force to the operator to deform a portion thereof inwardly into the recess. The deformation of the operator is employed to shift a contact bridging member between normal and actuated positions relative to the conductors within the recess.

Depending upon the function desired, the switch can be constructed as a normally open or normally closed switch, the molded parts enabling the formation of the individual elements in relatively small sizes, with the reliance upon deformation of a resilient element minimizing the required degree of precision of dimensions.

An object of the invention is to provide a switch which is capable of reliable operation even when of small size and which is not dependent upon extremely close tolerances for reliability.

Another object of the invention is to provide a switch of the kind referred to and wherein the electrically conductive parts are sealed effectively from foreign matter.

A further object of the invention is to provide such a switch which is adaptable as either a normally closed or a normally open switch.

Other objects and advantages of the invention will be pointed out specifically or will become apparent from the following description when it is considered in conjunction with the accompanying drawings, in which.

Figure 1:
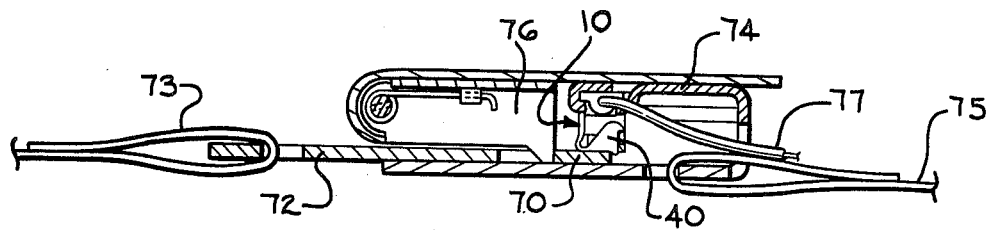
FIG. 1 is a longitudinal cross-sectional view taken through a typical automotive seat belt buckle assembly and showing a switch embodying the present invention employed to signal latching of the belt buckle.

A switch constructed according to the embodiment of FIGS. 2 - 5 is a normally open switch and includes a one-piece housing designated generally 10 formed in a conventional molding operation from a suitable thermoplastic material, such as polypropylene, which is electrically non-conductive. A pair of electrically conductive metal strips 12 and 14 are embedded in parallel, spaced apart relationship, see FIG. 3, within the housing 10 and are electrically connected respectively to electrical leads 16 and 18 which are mechanically mounted or molded within the housing 10 in enlarged bosses 20 and 22 integrally formed at opposite ends of the housing.

Figure 2:
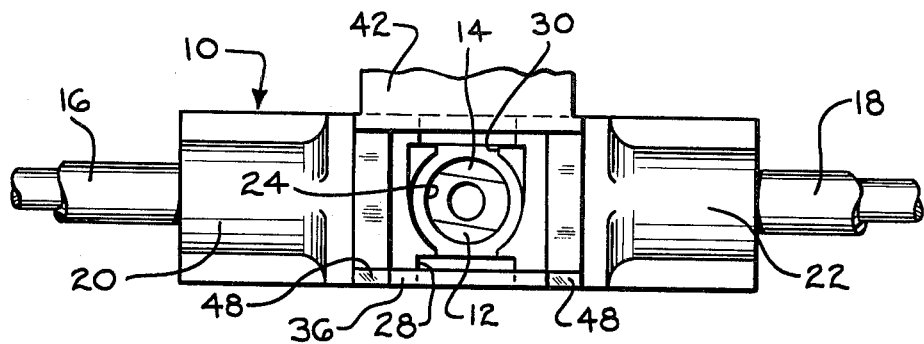
FIG. 2 is a top plan view of the housing of the switch of FIG. 1 with a portion of the actuator broken away.
Figure 3:
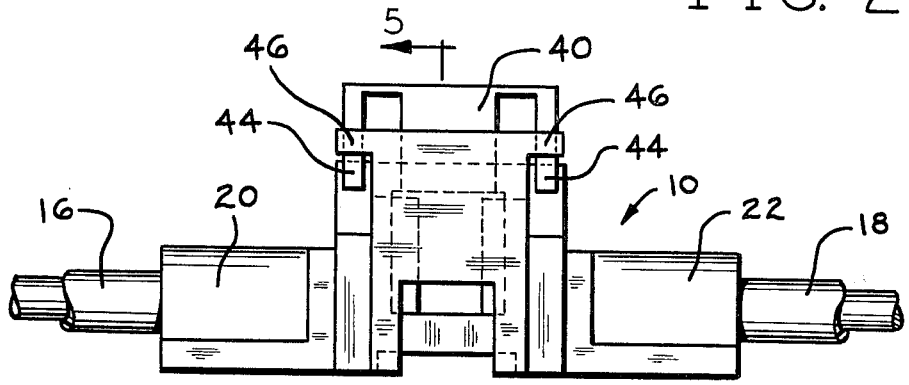
FIG. 3 is a side elevational view of the switch with the actuator in its normal position.
Figure 4:
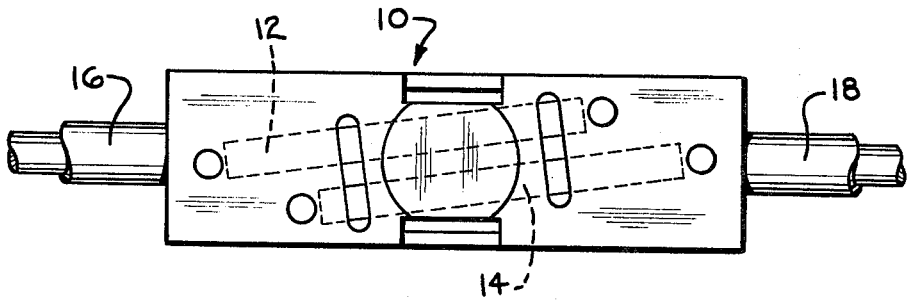
FIG. 4 is a bottom plan view of the switch.
Figure 5:
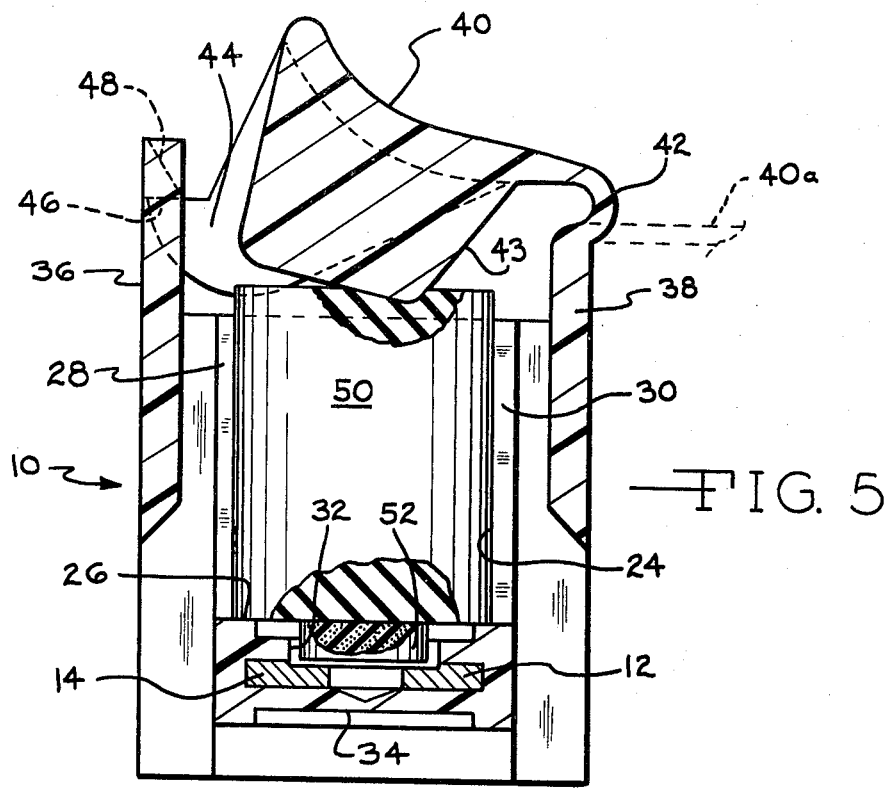
FIG. 5 is an enlarged cross-sectional view taken on the line 5—5 of FIG. 3 of a normally open switch.

As is best shown in FIGS. 2 and 5, the housing 10 is formed with a generally cylindrical bore 24 which extends axially into the housing from its upper end and terminates within the interior of the housing in a flat upwardly facing sealing surface or shoulder 26. Axially extending slots as at 28 and 30 extend downwardly along opposite sides of the housing and communicate with the bore 24 from the top of the housing to the surface 26.

In the normally open form of switch shown in FIG. 5, a stepped counterbore or recess 32 is formed coaxially and in prolongation of the bore 24 to a depth sufficient to expose the two conductors 12 and 14, the counterbore 32 terminating adjacent but short of the exterior of the lower wall 34 of the housing.

Integral panels 36 and 38 are formed on opposite sides of the housing 10. An actuator member 40 is molded integrally with the housing 10 and is integrally joined to the panel 30 by a relatively thin, flexible strap 42. As is best shown in FIG. 5, the configuration of the mold is such that the actuator 40 is molded in the position indicated in broken lines at 40a so that when the actuator 40 is in its normal operative position, shown in full lines in FIG. 5, the connecting strap 42 exerts a biasing force tending to rock the actuator clockwise from the full line position of FIG. 5. The actuator 40 includes a tongue 43 which, when the actuator is in its operative position, confronts the bore 24.

At opposite sides of the tongue 43 are formed integral, hook-shaped latching ears 44 which, when engaged beneath latching lugs 46 integrally formed on the front panel 36, restrain clockwise movement of the actuator 40 from the full line position of FIG. 5. Inclined cam surfaces 48 on the upper side of the latching lugs 46 assist in enabling the actuator 40 to be snapped into its operative position.

Referring now particularly to FIG. 5, an operating member 50 formed of a resilient, deformable, electrically non-conductive, rubbery material such as silicone rubber is accommated in the bore 24. The operator 50 is a right cylinder having a diameter chosen to achieve a press fit within the recess 24 so that once assembled, there is substantially no relative movement between the confronting surfaces of the member 50 and the wall of the bore 24. The lower end of the member 50 is firmly seated upon the shoulder 26 of the bore 24 to form an annular moisture and dust-tight seal around the periphery of the counterbore 32.

A disc-shaped bridging member 52 is fixed by a suitable adhesive to the lower end of the operator 50 and projects from the latter into the counterbore 32 in spaced relationship to the wall thereof and in overlying, spanning relationship with the two spaced conductors 12 and 14. The bridging member 52 is preferably made of a resiliently compressible, electrically non-conductive material, such as silicone rubber, having a substantial quantity of electrically conductive particles dispersed throughout the material. When the material is in a normal uncompressed state, the electrically conductive particles may be spaced from one another so that the elctrical resistance of the member 52 is infinite. When the bridging member is compressed, however, the electrically conductive particles are shifted into engagement with each other so as to render the member 52 conductive. Alternatively, the member 52 may be molded under a compressive force such that the conductive particles always engage one another, thereby rendering the member 52 conductive without the application of an external compressive force.

When the actuator 40 is in its normal position, shown in full lines in FIG. 5, the tongue engages and applies a slight degree of compressive force on the elastomeric operating member 50 which is insufficient to press the bridging member 52 downwardly into contact with the conductors 12 and 14, but is sufficient to cause the member 50 to engage the wall of the bore and effect a seal for the bore. When an external force is applied on the tongue 43 to depress the latter from the FIG. 5 position, the member 50 is resiliently deformed axially to cause its lower end to protrude downwardly into the counterbore 32 by an amount sufficient to move the bridging member 52 into contact with the conductors 12 and 14 and to compress the member 52 to a degree sufficient to bridge and establish an electrically conductive path between the conductors 12 and 14. Removal of the applied force from the tongue 43 enables the member to expand to its normal condition, thereby lifting the bridging member 52 off the conductors.

The normally closed embodiment of the switch employs a housing 10' which is initially molded in the same manner and to the same configuration, prior to machining, as the housing 10 of the normally open form of the switch described above. As in the previously described embodiment, electrical conductors 12' and 14' are embedded in the housing 10'.

In machining the housing for the normally closed form of the switch, a counterbore 32' is drilled upwardly through the bottom wall of the molded housing and the bottom wall 34' of the housing is milled off to a depth sufficient to expose the bottom sides of the conductors 12' and 14'. The inner end of the counterbore 32' communicates with the cylindrical bore 24' adjacent the shoulder 26' and communicates at its outer end with a larger counterbore 32''.

The recess in the bottom of the housing created by the formation of the counterbores 32' and 32'' is sealed by a bridging member 52' like the member 52 and which is bonded or otherwise sealingly secured to the bottom surface 34' of the housing to form a peripheral dust and moisture seal around the lower end of the recess.

A resilient, elastomeric member 50' is fitted into the bore 24' of the housing and is formed with a slightly reduced diameter, annular sealing lip 62 sealingly engaged with the shoulder 26' of the cylindrical bore 24'. A coaxially projecting extension 64 on the member 50' extends through the counterbore 32' into engagement with the upper surface of the bridging member 52'. Integral, upwardly projecting, cruciform ribs 66 and 68 are provided at the upper end of the operating member 50' to assist in making the seal between the lip 62 and the shoulder 26' substantially uniform around the entire seal periphery and to assure engagement between the extension 64 and the bridging member 52'.

A spring clip 60 has its opposite ends engaged at the bottom of the slots 28' and 30' and resiliently presses the bridging member 52' upwardly into contact with the exposed bottom surfaces of the conductors 12' and 14' and the confronting surface of the extension 64.

Figure 6:
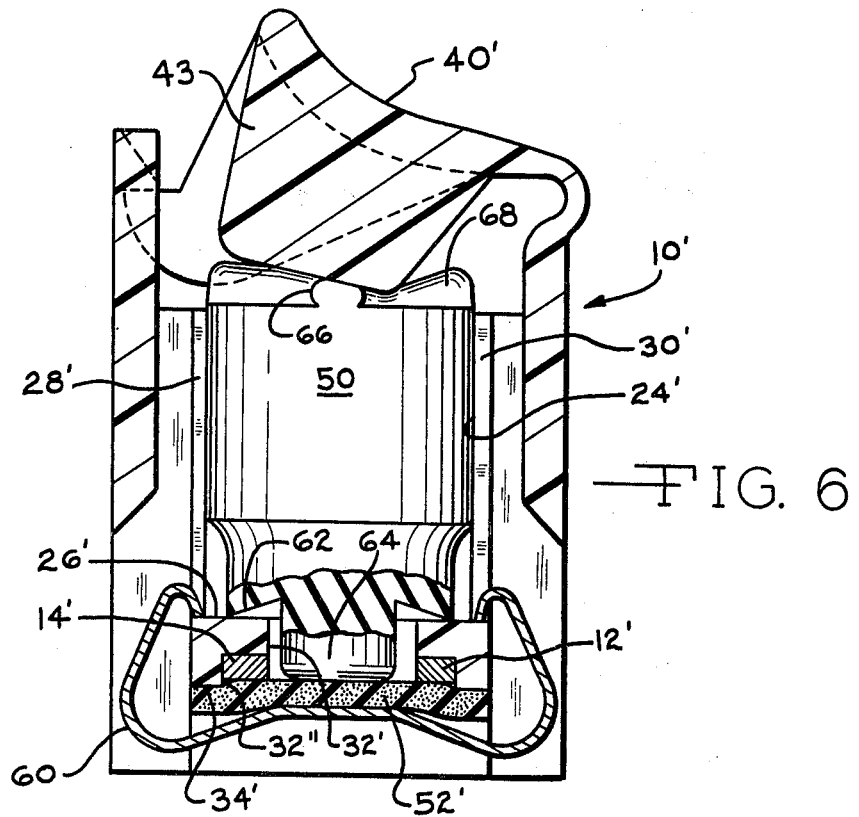
FIG. 6 is a cross-sectional view, similar to FIG. 5, showing a normally closed embodiment of the switch.

An actuator 40' like the actuator 40 has a tongue 43' which bears against the ribs 66 and 68 so as to preclude any upward movement of the operator 50' from the position shown in FIG. 6. In this position of the operator, the spring clip 60 maintains the bridging members 52' compressed diametrally so as to establish a conductive path between the conductors 12' and 14'. When the tongue 43' of the FIG. 6 embodiment is depressed, however, the member 50' will be resiliently deformed to project the extension 64 axially downwardly to force the bridging member 52' out of engagement with the conductors 12' and 14', and thereby break the circuit between the conductors.

In FIG. 1, an exemplary application of a switch constructed in accordance with the embodiment of the invention shown in FIGS. 2 – 5 is disclosed. The housing 10 is mounted within the interior of an automotive seat belt with the actuator 40 in its depressed position to which it has been cammed by the tongue 70 of one buckle part 72 of a seat belt strap 73, the tongue 70 being held within a companion buckle housing 74 of a belt strap 75 by a spring biased latch 76. Conductors, one of which is shown at 77, extend from the housing 10 to a signal or other device (not shown) that is adapted to be operated by the switch. If such signal or device is designed to operate only when the circuit is completed between the conductors of the switch, the latter will conform to the embodiment of FIGS. 2 – 5. If the signal or device is adapted to function only when no circuit is completed between the conductors of the switch, the latter will conform to the embodiment of FIG. 6.

Although two forms of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An electrical switch comprising a non-conductive housing having a main bore extending inwardly from one end of said housing means in said housing defining a shoulder at the inner end of said main bore and a second bore coaxial with said main bore extending inwardly of said housing from said shoulder; spaced apart electrical conductors carried by said housing and exposed within and on opposite sides of said second bore; a bridging member spanning said conductors and movable between positions in which it electrically connects and disconnects said conductors; a resiliently deformable operating member snugly mounted in said main bore and seated at its inner end on said shoulder, the inner end of said operating member being responsive to the application of an axially compressive force to the outer end thereof to protude inwardly beyond said shoulder into said second bore from a normal condition to a deformed condition thereby to effect movement of said bridging means from one of said positions to the other and being responsive to the release of said force to return to its normal condition and effect movement of said bridging means from said other position to said one position; and actuating means engageable witth said outer end of said operating member for for applying and releasing said compressive force to and from said operating member.

2. A switch according to claim 1 wherein said bridging member is carried by said operating member at said inner end thereof.

3. A switch according to claim 1 wherein said bridging member is carried by said housing in the path of protrusion of said inner end of said operating member.

4. A switch according to claim 1 wherein said bridging member is normally conductive.

5. A switch according to claim 1 wherein said bridging member is normally non-conductive and is rendered conductive in response to compression thereof.

6. A switch according to claim 1 wherein said operating member includes an extension at said inner end thereof of smaller diameter than that of said second bore and concentric therewith.

7. A switch according to claim 1 wherein said bridging member normally engages said conductors and including spring means on said housing acting on said bridging member for pressing said bridging member against said conductors.

8. A switch according to claim 7 wherein said inner end of said operating member normally engages said bridging member and wherein said spring means normally presses said bridging member against said inner end of said operating member.

9. A switch according to claim 1 wherein said actuating means comprises a tongue over-lying said outer end of said operating member and means mounting said tonge for movements axially of said main bore.

10. A switch according to claim 1 including means acting on said actuating means and maintaining the latter in compressive engagement with said operating member.

11. A switch according to claim 1 wherein said outer end of said operating member has at least one upstanding rib thereon confronting said actuating means.

* * * * *